United States Patent
Lee et al.

(10) Patent No.: US 10,151,537 B2
(45) Date of Patent: Dec. 11, 2018

(54) HEAT EXCHANGER UNIT

(71) Applicant: DOOSAN HEAVY INDUSTRIES & CONSTRUCTION CO., LTD., Changwon-si, Gyeongsangnam-do (KR)

(72) Inventors: Jae Dal Lee, Gimhae-si (KR); Woo Chul Kwon, Anyang-si (KR); Jin Woon Lee, Changwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 309 days.

(21) Appl. No.: 14/990,943

(22) Filed: Jan. 8, 2016

(65) Prior Publication Data

US 2016/0290729 A1    Oct. 6, 2016

(30) Foreign Application Priority Data

Apr. 2, 2015    (KR) .................. 10-2015-0047068

(51) Int. Cl.
| | | |
|---|---|---|
| *F23L 15/04* | (2006.01) | |
| *F28D 1/047* | (2006.01) | |
| *F22B 37/10* | (2006.01) | |
| *F22B 37/12* | (2006.01) | |
| *F28F 13/08* | (2006.01) | |
| *F28D 7/08* | (2006.01) | |
| *F28F 1/24* | (2006.01) | |
| *F28F 1/34* | (2006.01) | |

(Continued)

(52) U.S. Cl.
CPC .......... *F28D 1/0477* (2013.01); *F22B 37/101* (2013.01); *F22B 37/12* (2013.01); *F22D 1/08* (2013.01); *F23L 15/04* (2013.01); *F28D 7/085* (2013.01); *F28F 1/126* (2013.01); *F28F 1/24* (2013.01); *F28F 1/34* (2013.01); *F28F 13/08* (2013.01); *F28F 2215/04* (2013.01); *F28F 2215/10* (2013.01)

(58) Field of Classification Search
CPC .................................. F28F 1/10; F22B 37/101
USPC .......................................... 431/215; 165/154
See application file for complete search history.

(56) References Cited

U.S. PATENT DOCUMENTS

| | | | |
|---|---|---|---|
| 1,524,520 A | | 1/1925 | Junkers |
| 1,987,911 A | * | 1/1935 | Prickett .................. B01J 8/0207 |
| | | | 422/198 |

(Continued)

FOREIGN PATENT DOCUMENTS

| | | |
|---|---|---|
| JP | 55-162787 U | 11/1980 |
| JP | 61-027493 A | 2/1986 |

(Continued)

OTHER PUBLICATIONS

Communication dated Jun. 22, 2016 issued by the Korean Patent Office in counterpart application No. 10-2015-0047068.

(Continued)

*Primary Examiner* — Avinash Savani
(74) *Attorney, Agent, or Firm* — Invenstone Patent, LLC

(57) ABSTRACT

A heat exchanger unit includes tube units arranged within a duct unit for heat exchange with combustion gas supplied from a furnace of a thermal power plant, and heat exchanger fins longitudinally formed on outer peripheral surfaces of the tube units and having different thickness and sizes while heat exchange with the combustion gas is performed through the heat exchanger fin.

20 Claims, 16 Drawing Sheets

(51) Int. Cl.
*F28F 1/12* (2006.01)
*F22D 1/08* (2006.01)

(56) References Cited

U.S. PATENT DOCUMENTS

| | | | | |
|---|---|---|---|---|
| 2,728,202 A * | 12/1955 | Grubb | ................... | F25D 11/027 62/445 |
| 3,036,818 A * | 5/1962 | Legrand | ................... | F28D 7/06 165/137 |
| 3,270,807 A * | 9/1966 | Steadman | ................ | F28D 7/16 165/174 |
| 3,277,960 A * | 10/1966 | Maillet | ................... | B23C 3/34 165/181 |
| 3,621,108 A * | 11/1971 | Cleaveland | ............ | H01B 7/426 174/15.6 |
| 3,829,647 A * | 8/1974 | Cleaveland | ............ | H01B 7/426 165/182 |
| 4,284,133 A * | 8/1981 | Gianni | ................... | F28D 7/106 165/133 |
| 4,905,895 A * | 3/1990 | Grebe | ..................... | F24H 1/26 126/110 B |
| 5,035,052 A * | 7/1991 | Suzuki | ................... | F28F 1/128 165/151 |
| 5,318,112 A * | 6/1994 | Gopin | .................. | F28D 1/05366 165/151 |
| 5,775,411 A * | 7/1998 | Schuez | ................. | B21C 37/207 165/133 |
| 2005/0257921 A1 * | 11/2005 | Hu | ........................ | F28D 1/0443 165/140 |
| 2008/0262409 A1 * | 10/2008 | Derrico | ................... | A61M 5/44 604/19 |
| 2012/0272928 A1 | 11/2012 | Kameyama | | |

FOREIGN PATENT DOCUMENTS

| | | |
|---|---|---|
| JP | 61-128583 U | 8/1986 |
| JP | 10-213388 A | 8/1998 |
| JP | 2003-279279 A | 10/2003 |
| JP | 2004-144460 A | 5/2004 |
| KR | 20-1999-0035657 U | 9/1999 |
| WO | 2012/014934 A1 | 2/2012 |

OTHER PUBLICATIONS

Communication dated Feb. 26, 2016 issued by the Korean Intellectual Property Office in counterpart Korean Application No. 10-2014-0094845.

Communication dated Aug. 8, 2016 issued by the European Patent Office in counterpart application No. 16150609.2.

* cited by examiner

COMBUSTION GAS

HEAT EXCHANGER UNIT

CROSS-REFERENCE TO RELATED APPLICATIONS

This application claims priority to Korean Patent Application No. 10-2015-0047068, filed on Apr. 2, 2015, the disclosure of which is incorporated herein by reference in its entirety.

BACKGROUND

Field

Exemplary embodiments relate to performing heat exchange with combustion gas generated in a furnace of a thermal power plant, and more particularly, to a heat exchanger unit for more efficiently performing heat exchange by changing a heat exchange area with combustion gas or a flow thereof.

Description of the Related Art

In general, tubes for heat exchange are installed at the rear end of a furnace of a thermal power plant, and are used as a reheater for combustion air which is introduced into an absorption tower through heat exchange with combustion gas passing through the furnace.

A high-temperature fluid is moved into tubes, and exchanges heat with combustion air passing through a reheater, with the consequence that the temperature of the combustion air is relatively changed.

As the size of a furnace has been gradually increased in recent years, various errors and malfunction occur due to the use of low grade coal in a thermal power plant.

Heat exchanger fins in the form of spiral are conventionally installed in the longitudinal direction of tubes for the use thereof. However, the heat exchanger fins may disturb the stable flow of combustion air, and a large amount of ash contained in combustion may be stacked outside the fins.

For this reason, there are many problems in that the overall heat exchange performance of a reheater is deteriorated, and pressure drop is partially generated or heat transfer performance is deteriorated since combustion gas does not stably flow through a plurality of tubes.

[Patent Document 1] Korean Patent No. 10-0490722 (May 12, 2005)

SUMMARY

An object of the present disclosure is to provide a heat exchanger unit that more efficiently performs heat exchange with high-temperature combustion gas generated in a furnace of a thermal power plant by changing configurations of tube units for heat exchange with the combustion gas.

Other objects and advantages can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect, a heat exchanger unit includes tube units arranged within a duct unit for heat exchange with combustion gas supplied from a furnace of a thermal power plant, and heat exchanger fins longitudinally formed on outer peripheral surfaces of the tube units and having different thickness and sizes while heat exchange with the combustion gas is performed through the heat exchanger fin.

The tube units may have different diameters.

The tube units may consist of linear parts, each extending by a predetermined length in the duct unit, and curved parts extending outward from ends of the linear parts, and the linear parts and curved parts may be alternately repeated.

The tube units may include a first tube unit with which the combustion gas first comes into contact, and second to nth tube units arranged adjacent to the first tube unit, and the tube units may have increasing diameters as directed toward the nth tube unit from the first tube unit.

The heat exchanger fins may have thicknesses that become thick as directed toward the nth tube unit from the first tube unit.

A spaced distance between the heat exchanger fins may be small toward the nth tube unit from the first tube unit.

The heat exchanger fin located adjacent to an inner side of the duct unit may have a relatively thinner thickness than the heat exchanger fin located at a center of the duct unit.

Each of the heat exchanger fins may selectively have one of a flat shape, a trapezoidal shape that has a decreased width outward of the tube units, and a spiral shape that has a predetermined width and thickness in a longitudinal direction of the tube units.

In accordance with another aspect, a heat exchanger unit includes tube units arranged within a duct unit for heat exchange with combustion gas supplied from a furnace of a thermal power plant, and heat exchanger fins longitudinally formed on outer peripheral surfaces of the tube units and having different thickness and sizes while heat exchange with the combustion gas is performed through the heat exchanger fins, wherein the heat exchanger fins are arranged in a zigzag form in a movement direction of the combustion gas.

The tube units may consist of linear parts, each extending by a predetermined length in the duct unit, and curved parts extending outward from ends of the linear parts, the linear parts and curved parts being alternately repeated.

The tube units may include a first tube unit with which the combustion gas first comes into contact, and second to nth tube units arranged adjacent to the first tube unit, the tube units having increasing diameters as directed toward the nth tube unit from the first tube unit.

The heat exchanger fins may include first heat exchanger fins arranged to be inclined at a first angle of inclination to the movement direction of the combustion gas in tube units such as the first tube unit, and second heat exchanger fins arranged to be inclined at a second angle of inclination, i.e. in a direction opposite to an inclined direction of the first heat exchanger fins in tube units such as the second tube unit adjacent to the first tube unit, the first and second heat exchanger fins being alternately repeated in a longitudinal direction of the duct unit.

The first angle of inclination may be an angle of 10 to 15 degrees, and the second angle of inclination may be an angle of −10 to −15 degrees.

In accordance with a further aspect, a heat exchanger unit includes a plurality of tube units arranged within a duct unit for heat exchange with combustion gas supplied from a furnace of a thermal power plant, heat exchanger fins longitudinally formed on outer peripheral surfaces of the tube units and having different thickness and sizes while heat exchange with the combustion gas is performed through the heat exchanger fins, and a diffusion part defining a predetermined space in the duct unit for diffusion of the combustion gas.

The tube units may include a first tube unit with which the combustion gas first comes into contact, and second to nth tube units arranged adjacent to the first tube unit, and the diffusion part may be formed between the first to nth tube units.

The diffusion part may define spaces having different sizes in a longitudinal direction of the duct unit.

When the diffusion part is configured of a plurality of diffusion parts in the longitudinal direction of the duct unit, areas of spaces defined by the diffusion parts may be decreased toward a rear end of the duct unit in the longitudinal direction thereof.

It is to be understood that both the foregoing general description and the following detailed description are exemplary and explanatory and are intended to provide further explanation of the invention as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
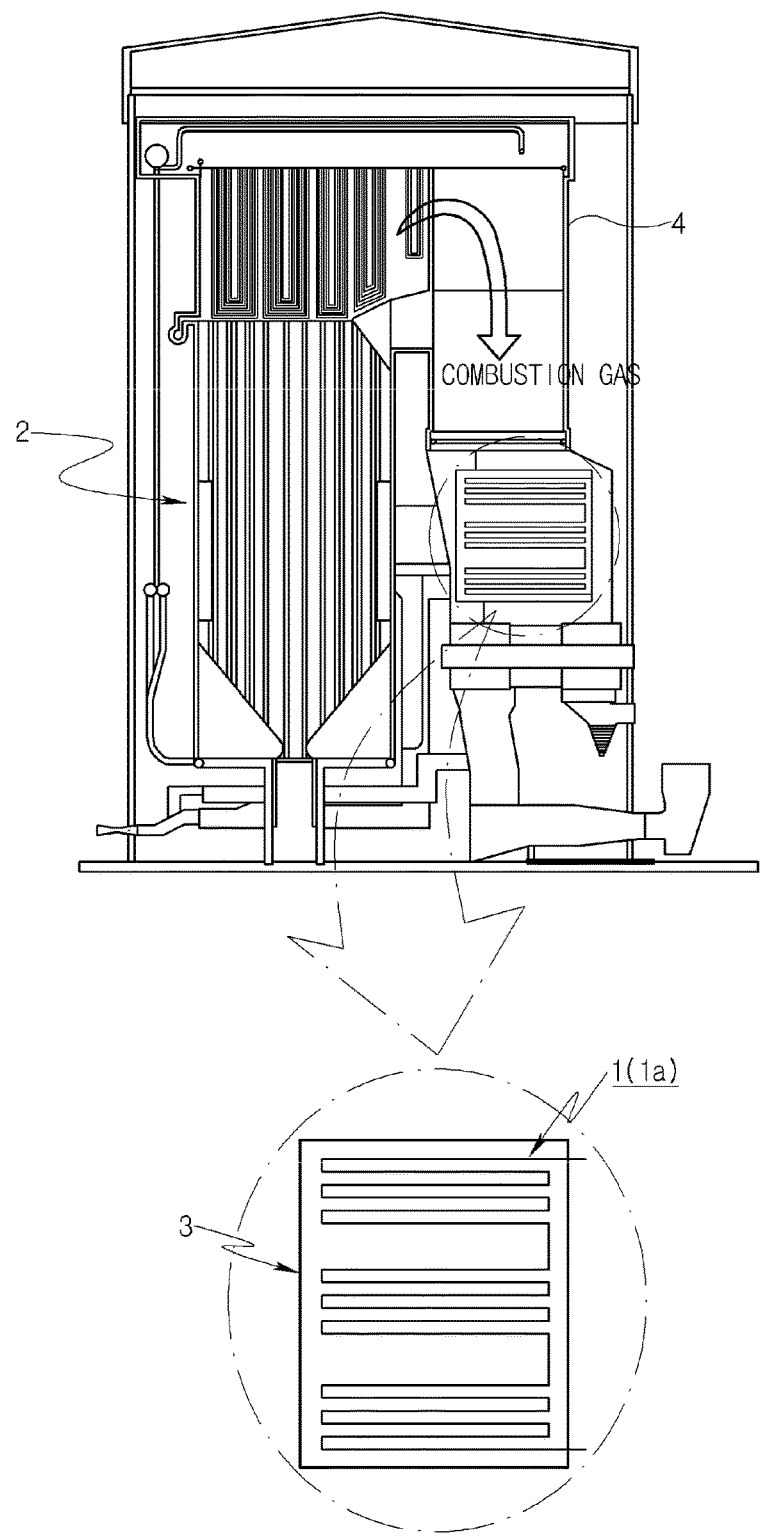
FIG. 1 is a view illustrating the state in which combustion gas is supplied from a furnace to a heat exchanger unit according to a first exemplary embodiment.

Heat exchanger units and heat exchanger fins according to exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

First, heat exchanger units according to various embodiments will be described for convenience's sake.

Figure 2:
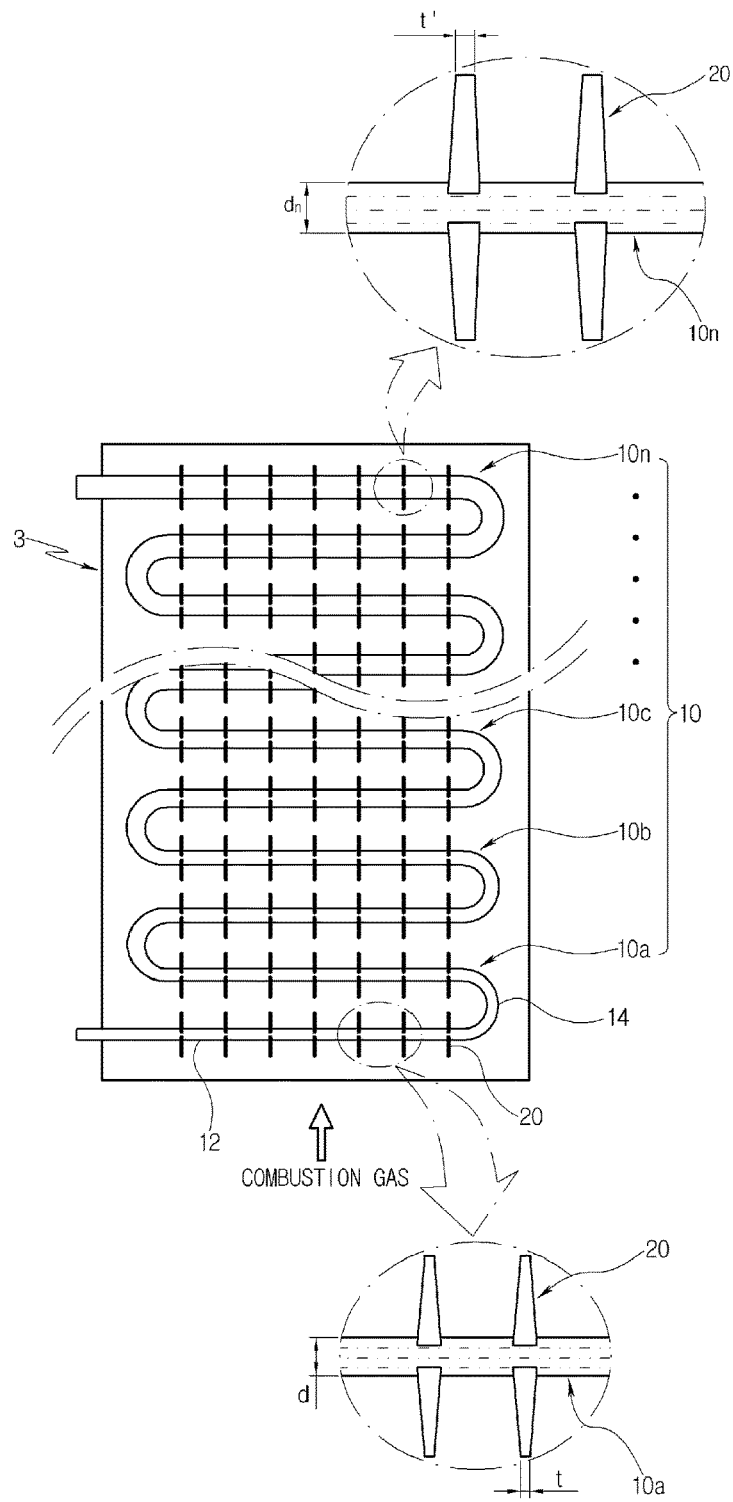
FIG. 2 is a view illustrating a configuration of the heat exchanger unit according to the first exemplary embodiment.

FIG. 1 is a view illustrating the state in which combustion gas is supplied from a furnace to a heat exchanger unit according to a first embodiment of the present disclosure. FIG. 2 is a view illustrating a configuration of the heat exchanger unit according to the first embodiment of the present disclosure.

Referring to FIGS. 1 and 2, the heat exchanger unit, which is designated by reference numeral 1, according to the first embodiment of the present disclosure is installed at the rear end of a furnace 2 of a thermal power plant, and exchanges heat between a fluid flowing therein and combustion gas flowing outside the heat exchanger unit 1 in order to serve as a reheater for increasing the temperature of the fluid. The heat exchanger unit 1 includes tube units 10 arranged within a duct unit 3 for heat exchange with combustion gas supplied from the furnace 2 of the thermal power plant, and heat exchanger fins 20 which are longitudinally formed on the outer peripheral surfaces of the tube units 10 and have different thickness and sizes while heat exchange with the combustion gas is performed through the heat exchanger fins 20.

As illustrated in the drawings, the furnace 2 which generates high-temperature combustion gas is disposed in the thermal power plant. The combustion gas generated in the furnace 2 is moved to a reheater 4 disposed at the rear end thereof. The heat exchanger unit 1 is disposed within the reheater 4. Alternatively, the heat exchanger unit 1 may be disposed in either the reheater 4 or the duct unit 3 connected to the lower end of the reheater 4, or may be disposed in all of them. In the present embodiment, the heat exchanger unit 1 will be described to be disposed in the duct unit 3.

The tube units 10 may have a uniform diameter or different diameters. When the tube units 10 extend while having different diameters, the diameters of the tube units 10 increase in the movement direction of combustion gas, thereby enabling a heat exchange area with the combustion gas to be increased. Consequently, it is possible to improve the heat exchange efficiency of the heat exchanger unit 1 with respect to the combustion gas discharged from the furnace 2.

Each of the tube units 10 consists of a linear part 12 extending by a predetermined length in the duct unit 3, and a curved part 14 extending outward from the end of the linear part 12. A plurality of linear parts 12 and curved parts 14 extend in the form in which they are alternately repeated. For reference, the linear parts 12 are not limited to having a specific length, but they have a fixed length with consideration for the limited area of the duct unit 3. In addition, the radii of the curved parts 14 are set through a simulation with consideration for the limited area of the duct unit 3.

Each tube unit 10 is made of a material having high heat transfer coefficient for more efficiently performing heat exchange with combustion gas. For example, the tube unit 10 is made of copper or a material having heat transfer coefficient similar to that of copper.

The tube units 10 include a first tube unit 10a with which combustion gas first comes into contact, and second to nth tube units 10b to 10n arranged adjacent to the first tube unit 10a. The tube units have increasing diameters as directed toward the nth tube unit 10n from the first tube unit 10a. This is for increasing a heat transfer area by increasing the diameters of the tube units 10 rather than when the tube units 10 extend in the form of a fixed diameter. In addition, it is possible to improve heat transfer efficiency per unit area of each tube unit 10 by increasing the diameter thereof.

The lengths and extended forms of the first and nth tube units 10a and 10n may vary according to the layout of the duct unit 3. The tube units 10 shown in the drawings are illustrative to help understanding of the present disclosure, and may have various paths according to the layout of the duct unit 3. In addition, the first to nth tube units 10a to 10n are arranged at intervals in the longitudinal direction of the duct unit 3 in the state in which they come into close contact with or are close to each other.

The tube units 10 have increasing diameters as directed toward the nth tube unit 10n from the first tube unit 10a. In this case, if the first tube unit 10a has a diameter of dl and the nth tube unit 10n has a diameter of dn, the diameter ratio of dn to d1 is about 1.3d to 1.6d. Thus, heat exchange efficiency can be improved through an increase in contact area between combustion gas and the tube units 10.

For example, when it is assumed that combustion gas is moved to the installation position of the first tube unit 10a and is then moved from initial position a to position b, an amount of pressure drop from the position a to the position b must be maintained to a minimum such that the combustion gas may stably flow from the adjacent second tube unit 10b to the nth tube unit 10n without staying. Accordingly, the nth tube unit 10b has a relatively greater diameter than the first tube unit 10a.

It is preferable that the tube units 10 be disposed perpendicular to the movement direction of combustion gas and the heat exchanger fins 20 be disposed in parallel with the movement direction of combustion gas, as illustrated in the drawings. Thus, it is possible to minimize flow resistance generated between the combustion gas and the heat exchanger fins 20 and to prevent the deterioration of heat transfer efficiency due to the generation of turbulence.

The heat exchanger fins 20 may have a uniform thickness as a whole, or may become thick as directed toward the nth tube unit 10n from the first tube unit 10a. In addition, the thickness (t) of the heat exchanger fin in the first tube unit 10a differs from the thickness (t') of the heat exchanger fin in the nth tube unit 10n, as illustrated in the drawings.

The thickness (t) of the heat exchanger fin is gradually increased at a certain rate, without being irregularly increased, as directed toward the nth tube unit 10n from the first tube unit 10a. Therefore, the contact area with combustion gas is increased, and thus heat exchange efficiency in the heat exchanger fins 20 is improved. Consequently, heat exchange with thermal energy included in a significant amount of combustion gas can be performed.

Figure 3:
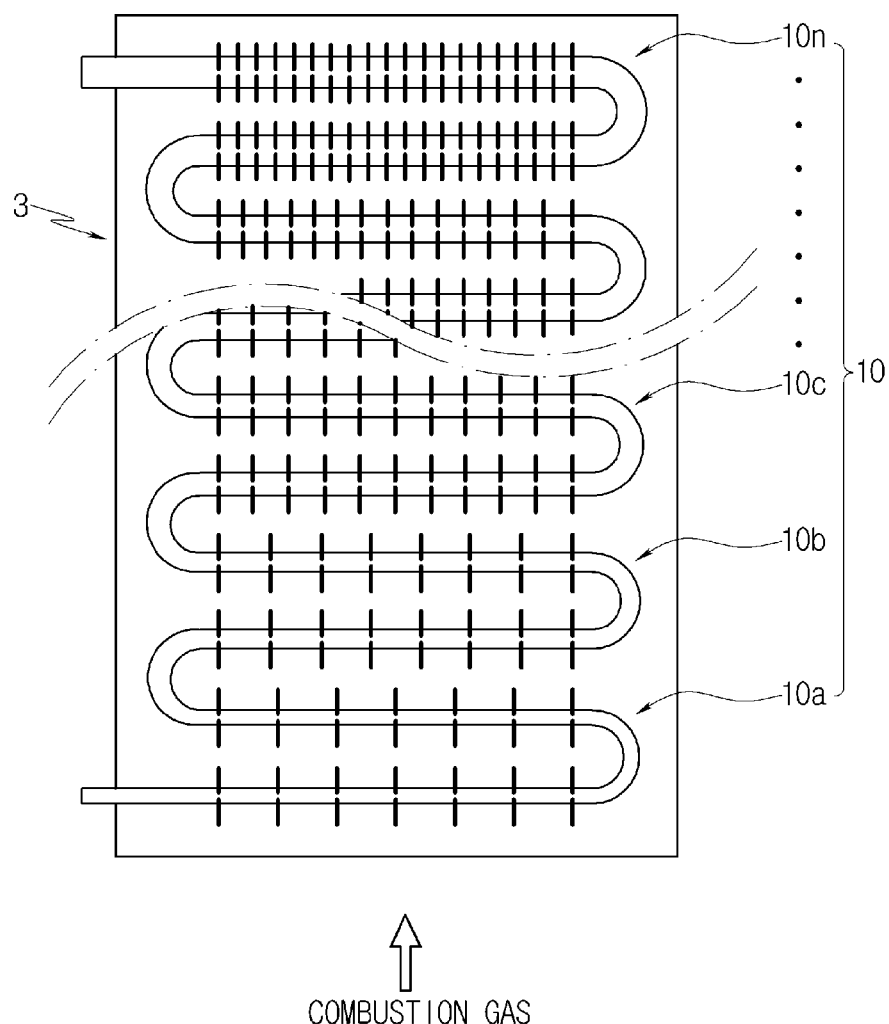
FIGS. 3 and 4 are views various examples of heat exchanger units according to the first exemplary embodiment.

Referring to FIG. 3, heat exchanger fins 20 are arranged such that the spaced distance thereof is gradually small toward the nth tube unit 10n from the first tube unit 10a. As a result, when combustion gas moves to the nth tube unit 10n from the first tube unit 10a in which heat exchange is initially performed, the flow rate of the combustion gas may be prevented from decreasing in the first tube unit 10a so that the combustion gas is stably moved to the nth tube unit 10n.

Through such a structure, the flow of the combustion gas may be stabilized and the flow rate of the combustion gas may be maintained at a certain rate even when the length of the duct unit 3 is elongated, with the consequence that heat exchange efficiency between the first tube unit 10a and the nth tube unit 10n may be maintained.

Figure 4:
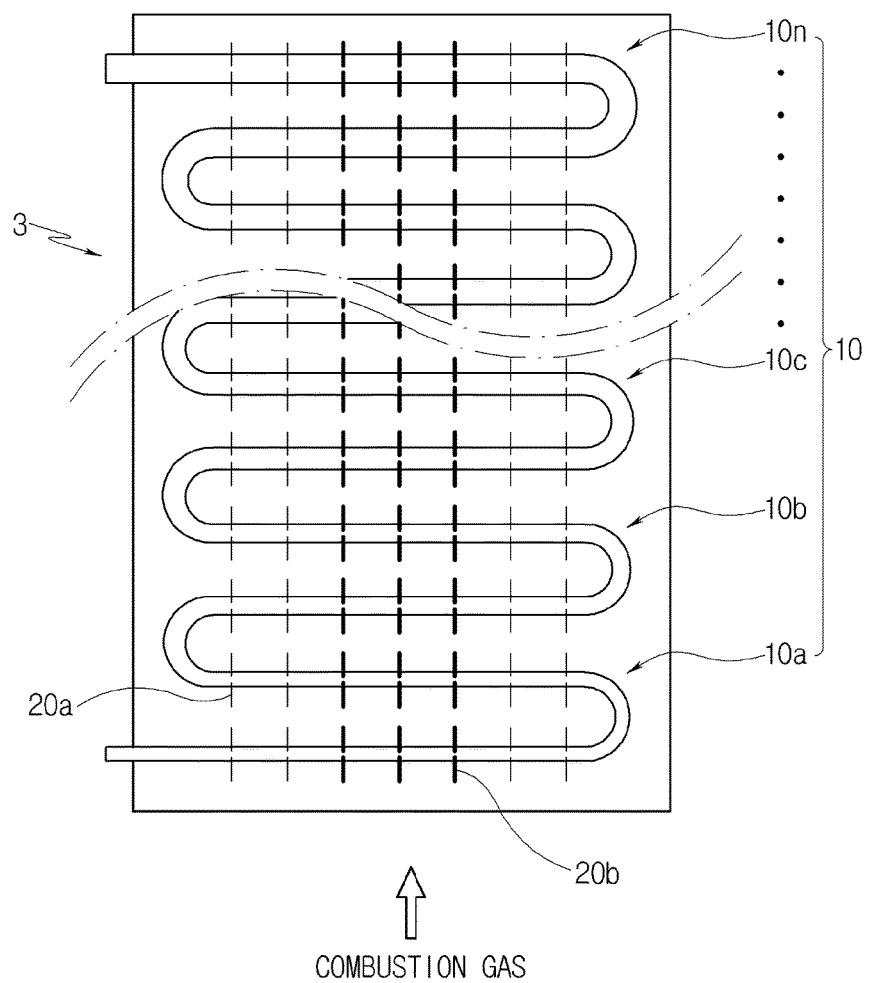

Referring to FIG. 4, a heat exchanger fin 20a located adjacent to the inner side of the duct unit 3 has a relatively thinner thickness than a heat exchanger fin 20b located at the center of the duct unit 3. As a result, flow resistance generated between combustion gas and the heat exchanger fin 20a when the combustion gas moves along the inner side of the duct unit 3 may be minimized and the flow rate of the combustion gas may be stably maintained in a region adjacent to the inner side of the duct unit 3.

Each heat exchanger fin 20 according to the present embodiment may selectively have one of a flat shape, a trapezoidal shape that has a decreased width outward of the tube units 10, and a spiral shape that has a predetermined width and thickness in the longitudinal direction of the tube units 10.

In addition, heat exchange parts (not shown) may be formed on the facing surfaces of the heat exchanger fins 20. The heat exchange parts may increase the surface areas of the heat exchanger fins 20, thereby decreasing pressure drop and simultaneously improving heat exchange efficiency when combustion gas passes through the heat exchanger fins 20, compared to when the heat exchange parts are not present. Each of the heat exchange parts may have a hemispherical shape that is concave or convex from the surface of the associated heat exchanger fin 20, or may be a slit or wave type heat exchange part. The density, size, or arrangement of the heat exchange parts may be similar to or differ from each other in directions in which combustion gas is introduced into and discharged from the heat exchanger fins 20.

A heat exchanger unit according to a second embodiment of the present disclosure will be described with reference to the drawings (for convenience's sake, detailed description of the same configurations as those of the above-mentioned embodiment will be omitted).

Figure 5:
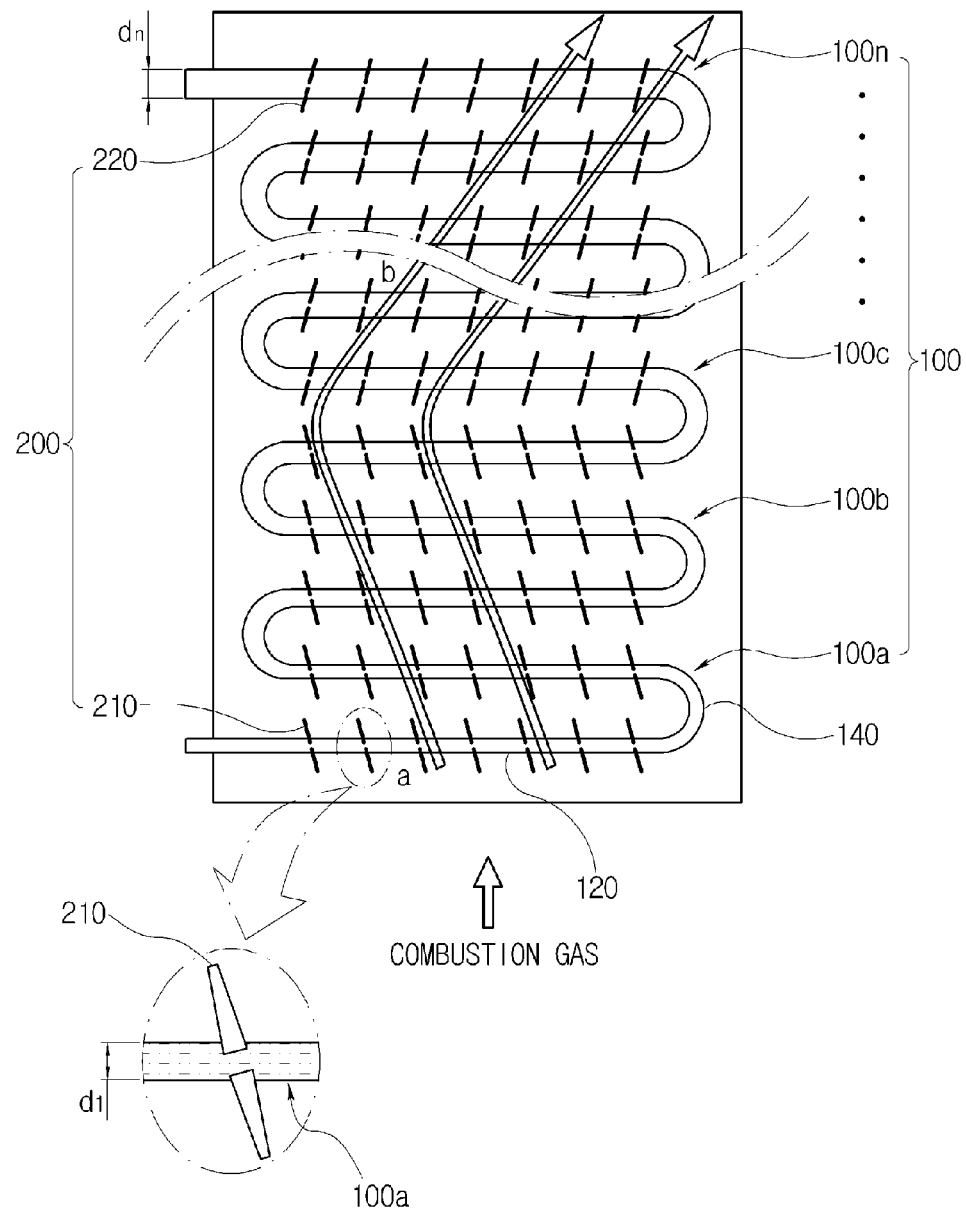
FIG. 5 is a view illustrating a configuration of a heat exchanger unit according to a second exemplary embodiment.

Referring to FIG. 1 or 5, the heat exchanger unit, which is designated by reference numeral la, according to the second embodiment of the present disclosure includes tube units 100 arranged within a duct unit 3 for heat exchange with combustion gas supplied from a furnace 2 of a thermal power plant, and heat exchanger fins 200 which are longitudinally formed on the outer peripheral surfaces of the tube units 100 and have different thickness and sizes while heat exchange with the combustion gas is performed through the heat exchanger fins 200. The heat exchanger fins 200 are arranged in a zigzag form in the movement direction of combustion gas so as to guide the movement of the combustion gas. Thereby, a time for which the combustion gas passing through the heat exchanger unit la stays therein is increased, and heat exchange efficiency is therefore improved.

Each of the tube units 100 consists of a linear part 120 extending by a predetermined length in the duct unit 3, and a curved part 140 extending outward from the end of the linear part 120. A plurality of linear parts 120 and curved parts 140 extend in the form in which they are alternately repeated.

The linear parts 120 and curved parts 140 extend in the form in which they are alternately repeated. The linear parts 120 are not limited to having a specific length, but they have a fixed length with consideration for the limited area of the duct unit 3.

The tube units 100 include a first tube unit 100a with which combustion gas first comes into contact, and second to nth tube units 100b to 100n arranged adjacent to the first tube unit 100a. The tube units have increasing diameters as directed toward the nth tube unit 100n from the first tube unit 100a. This is for increasing a heat transfer area by increasing the diameters of the tube units 100 rather than when the tube units 100 extend in the form of a fixed diameter, and thereby for improving heat transfer efficiency per unit area of each tube unit 100.

The lengths and extended forms of the first and nth tube units 100a and 100n may vary according to the layout of the duct unit 3, and are not necessarily limited to the form illustrated in the drawings. In addition, the first to nth tube units 100a to 100n are arranged at intervals in the state in which they come into close contact with or are close to each other.

The tube units 100 have increasing diameters as directed toward the nth tube unit 100n from the first tube unit 100a. In this case, if the first tube unit 100a has a diameter of d1 and the nth tube unit 100n has a diameter of dn, the diameter ratio of dn to d1 is about 1.3d to 1.6d. Thus, heat exchange efficiency can be improved through an increase in contact area between combustion gas and the tube units 100.

For example, when it is assumed that combustion gas is moved to the installation position of the first tube unit 100a and is then moved from initial position a to position b, an amount of pressure drop from the position a to the position b must be maintained to a minimum such that the combustion gas may stably flow from the adjacent second tube unit 100b to the nth tube unit 100n without staying. Accordingly, the nth tube unit 100b has a relatively greater diameter than the first tube unit 100a.

It is preferable that the tube units 100 be disposed perpendicular to the movement direction of combustion gas and the heat exchanger fins 200 be disposed in parallel with the movement direction of combustion gas, as illustrated in the drawings. Thus, it is possible to minimize flow resistance generated between the combustion gas and the heat exchanger fins 20 and to prevent the deterioration of heat transfer efficiency due to the generation of turbulence.

The heat exchanger fins 200 include first heat exchanger fins 210 which are arranged to be inclined at a first angle of inclination to the movement direction of combustion gas in tube units such as the first tube unit 100a, and second heat exchanger fins 220 which are arranged to be inclined at a second angle of inclination, i.e. in a direction opposite to the inclined direction of the first heat exchanger fins 210 in tube units such as the second tube unit 100b adjacent to the first tube unit 100a. The first and second heat exchanger fins 210 and 220 are alternately repeated in the longitudinal direction of the duct unit 3.

When combustion gas is moved in the duct unit 3, the combustion gas may exchange heat with a fluid supplied to the tube units 100 while linearly moving in the longitudinal direction of the duct unit 3. However, the heat exchanger fins 200 are obliquely arranged in order to increase a time for which the combustion gas stays in the duct unit. Consequently, the combustion gas can smoothly flow, and heat exchange efficiency can be simultaneously improved.

The heat exchanger fins 200 are arranged such that the first heat exchanger fins 210 are inclined at the first angle in the left direction, and the second heat exchanger fins 220 are inclined at the second angle in the right direction. Therefore, the combustion gas moves in a zigzag form in the left and right directions.

The first angle of inclination may be an angle of 10 to 15 degrees, and the second angle of inclination may be an angle of −10 to −15 degrees. The angle of inclination may also be increased or decreased by an angle of about 1 to 5 degrees.

The heat exchanger fins 200 may have a uniform thickness (t) as a whole, or may become thick as directed toward the nth tube unit 100n from the first tube unit 100a. The thickness (t) of the heat exchanger fin is gradually increased at a certain rate, without being irregularly increased, as directed toward the nth tube unit 100n from the first tube unit 100a. Therefore, the contact area with combustion gas is increased, and thus heat exchange efficiency in the heat exchanger fins 200 is improved. Consequently, heat exchange with thermal energy included in a significant amount of combustion gas can be performed.

Each heat exchanger fin 200 may selectively have one of a flat shape, a trapezoidal shape that has a decreased width outward of the tube units 100, and a spiral shape that has a predetermined width and thickness in the longitudinal direction of the tube units 100.

A heat exchanger unit according to a third embodiment of the present disclosure will be described with reference to the drawings (for convenience's sake, detailed description of the same configurations as those of the above-mentioned embodiments will be omitted).

For reference, the present embodiment differs from the above-mentioned embodiments in that a diffusion part is formed in a duct unit in the longitudinal direction thereof. Accordingly, since the diffusion and delay of combustion gas and the heat exchange efficiency of tube units located in front of and behind the diffusion part are simultaneously improved, the overall heat exchange efficiency of the heat exchanger unit can be improved.

Figure 6:
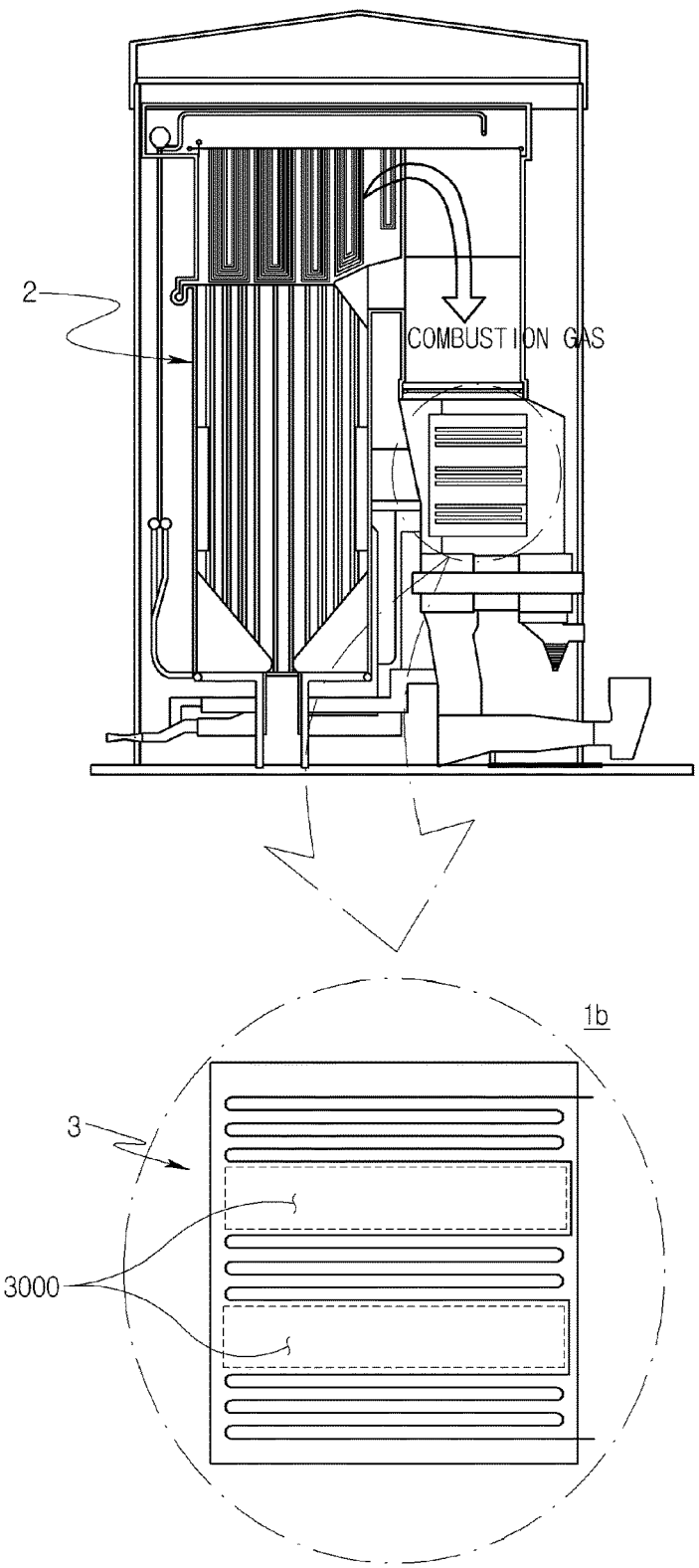
FIG. 6 is a view illustrating the state in which combustion gas is supplied from a furnace to a heat exchanger unit according to a third exemplary embodiment.
Figure 7:
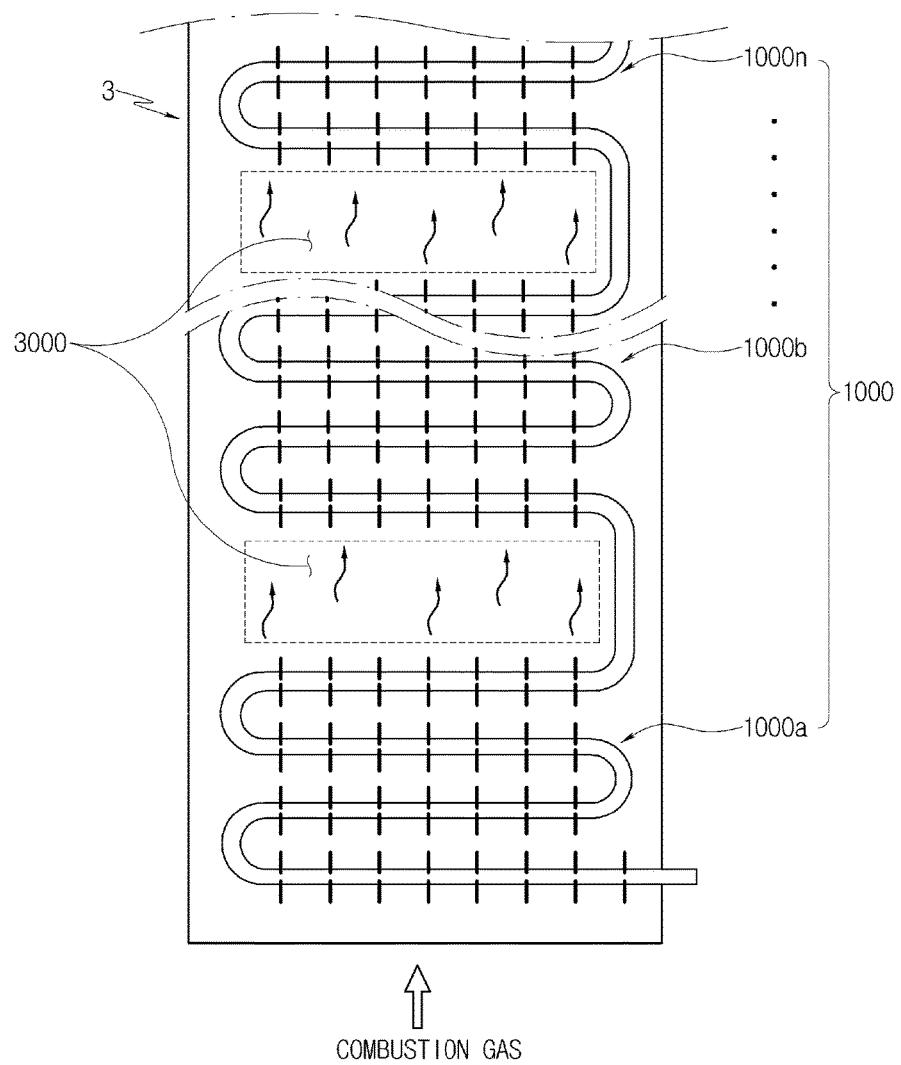
FIGS. 7 to 9 are views illustrating various examples of diffusion parts formed in the heat exchanger unit according to the third exemplary embodiment.
Figure 8:
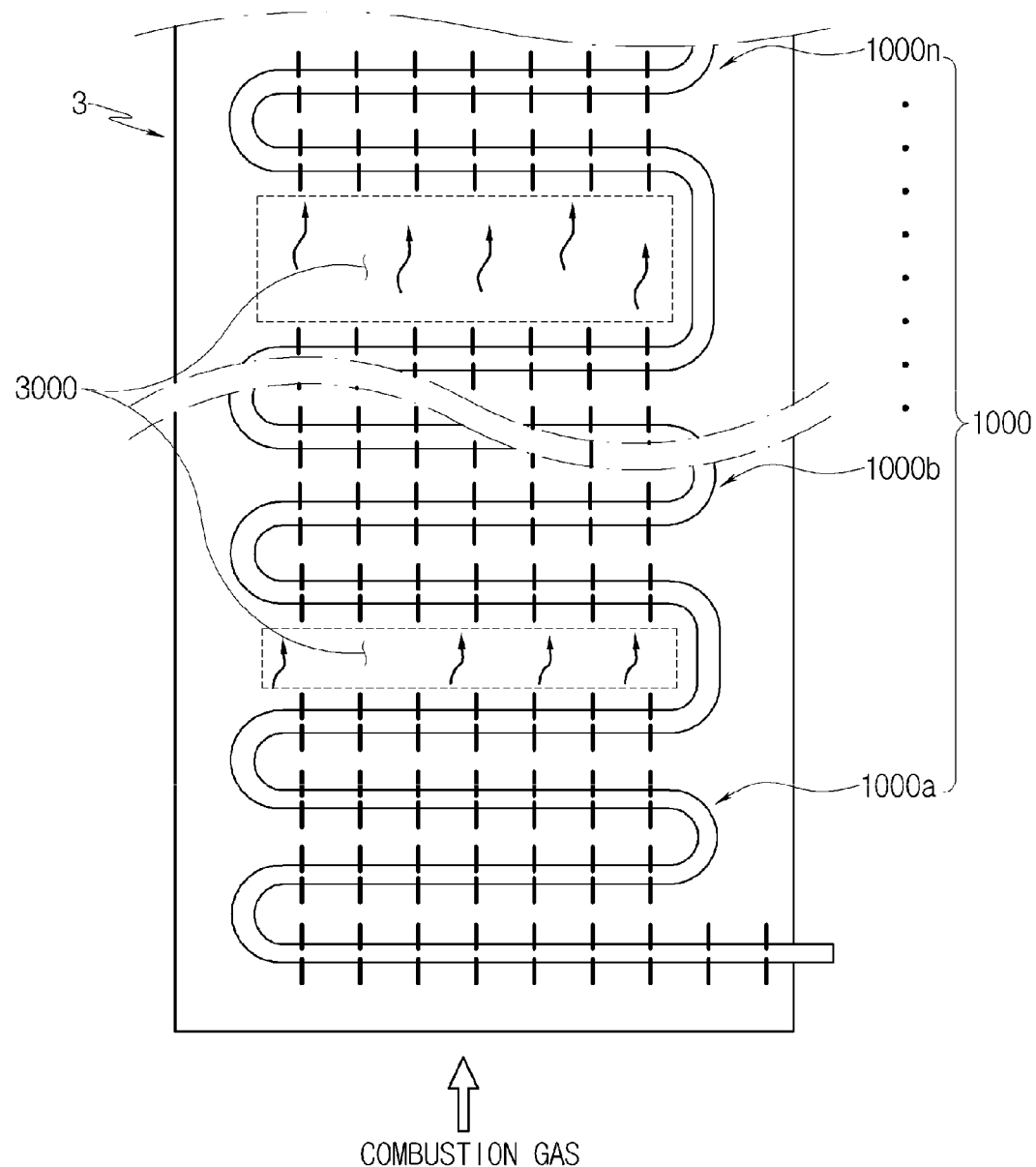

Referring to FIGS. 6 to 8, the heat exchanger unit, which is designated by reference numeral 1b, includes a plurality of tube units 1000 arranged within a duct unit 3 for heat exchange with combustion gas supplied from a furnace 2 of a thermal power plant, heat exchanger fins 2000 which are longitudinally formed on the outer peripheral surfaces of the tube units 1000 and have different thickness and sizes while heat exchange with the combustion gas is performed through the heat exchanger fins 2000, and a diffusion part 3000 which forms a predetermined space in the duct unit 3 for diffusion of the combustion gas.

The diffusion part 3000 is not limited to having a size illustrated in the drawings, and the size of the diffusion part 3000 may be changed. For example, diffusion parts 3000 form spaces having the same size or different sizes in the longitudinal direction of the duct unit 3. Since the flow of combustion gas is simultaneously diffused and delayed in the diffusion part 3000, a time for which the combustion gas stays in the duct unit 3 is increased through the diffusion and delay thereof, thereby enabling heat exchange efficiency to be improved by the tube units 1000 and the heat exchanger fins 2000.

In addition, since heat exchange is performed in the state in which a time for maintaining contact between combustion gas and heat exchanger fins 2000 disposed in first and second tube units 1000a and 1000b located behind and in front of any diffusion part 3000 formed between specific tube units is increased, the overall heat exchange efficiency of the heat exchanger unit 1b can be improved.

Figure 9:
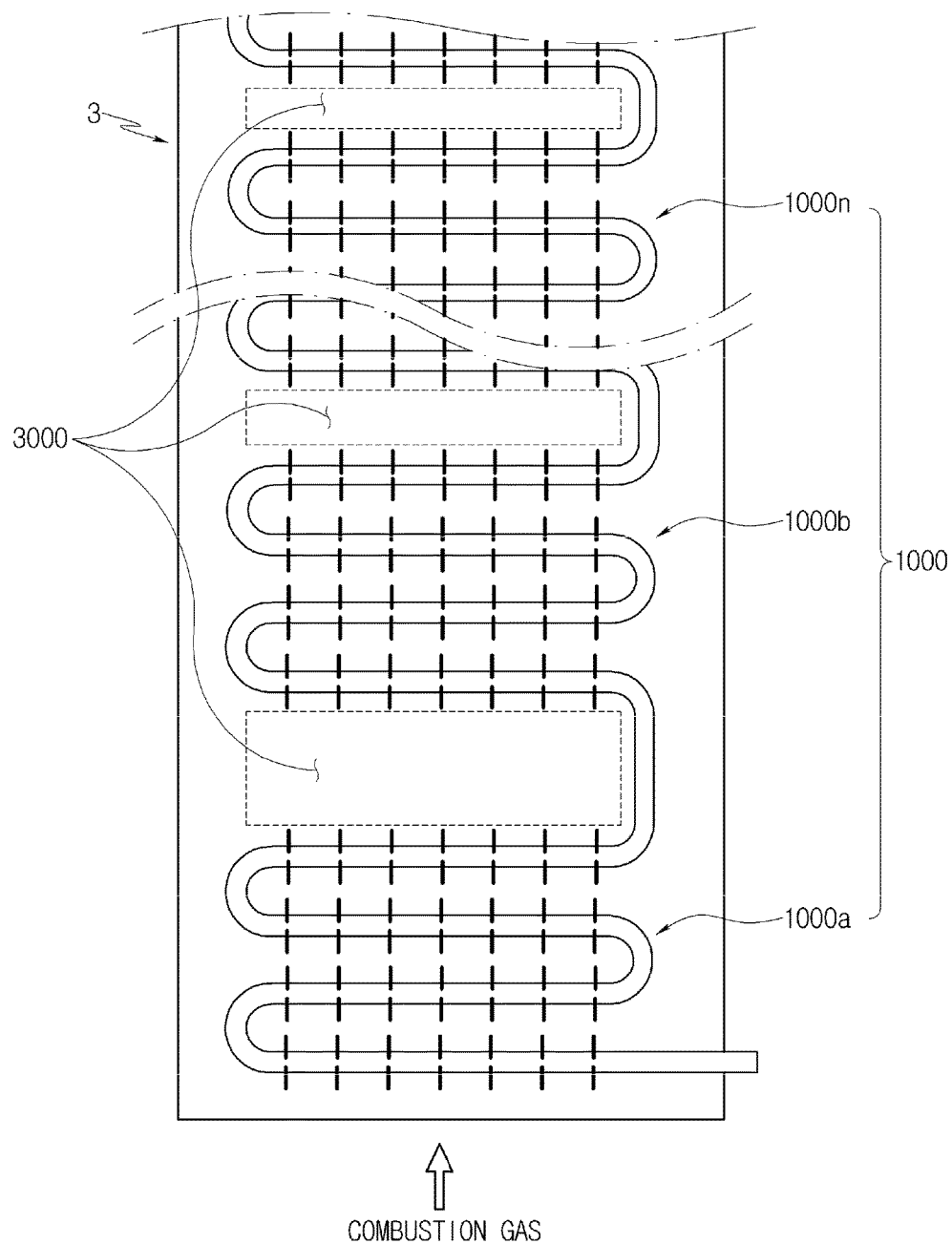

Referring to FIG. 9, when the diffusion part 3000 is configured of a plurality of diffusion parts in the longitudinal direction of the duct unit 3, the spatial areas of the diffusion parts 3000 are gradually decreased toward the rear end of the duct unit 3 in the longitudinal direction thereof. This is to prevent the flow of combustion gas from being delayed at the rear end in order to minimize pressure drop by the stable movement of the combustion gas.

The tube units 1000 include a first tube unit 1000a with which combustion gas first comes into contact, and second to nth tube units 1000b to 1000n arranged adjacent to the first tube unit 1000a. The diffusion part 3000 is formed between the first tube unit 1000a and the nth tube unit 1000n. The diffusion part 3000 may be disposed at an optimal position through a simulation with consideration for the extension length of the duct unit 3, and may be configured of a plurality of diffusion parts.

The tube units 1000 may have increasing diameters as directed toward the nth tube unit 1000n from the first tube unit 1000a. This is for increasing a heat transfer area by increasing the diameters of the tube units 1000 rather than when the tube units 1000 extend in the form of a fixed diameter, and thereby for improving heat transfer efficiency per unit area of each tube unit 1000.

Next, various examples of heat exchanger fins of the heat exchanger unit according to the present disclosure will be described with reference to the drawings (for convenience's sake, detailed description of the same configurations as those of the above-mentioned embodiments will be omitted).

Figure 10:
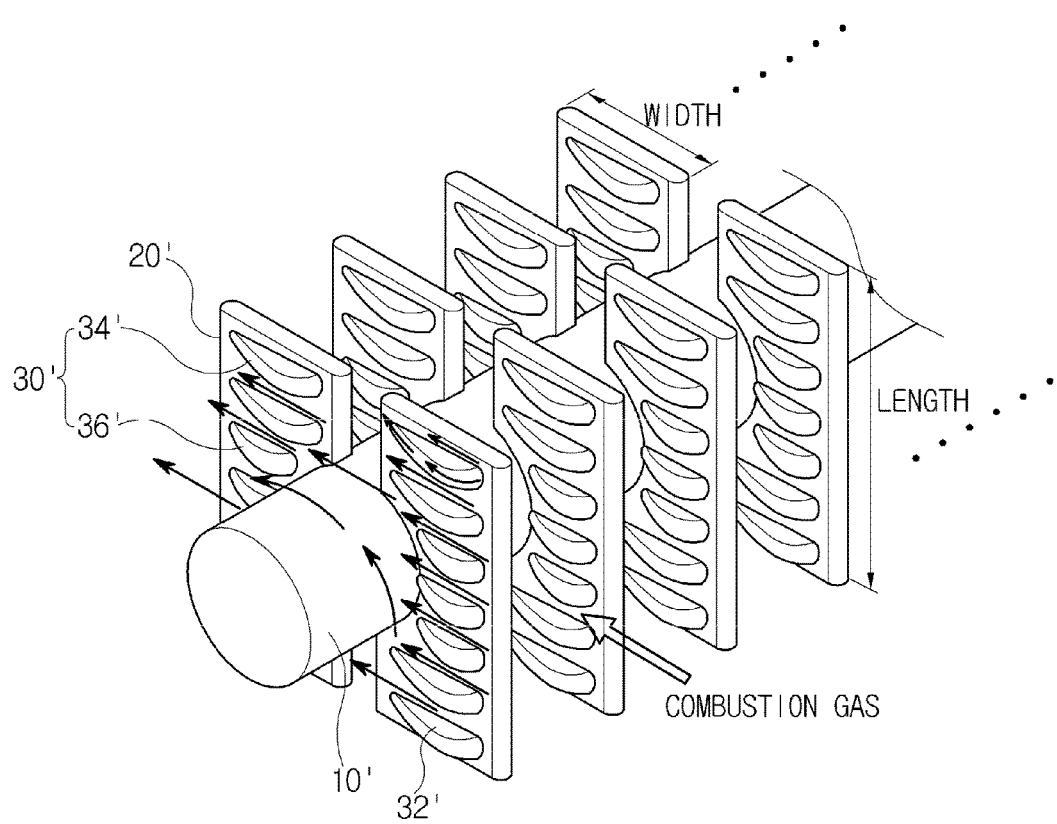
FIG. 10 is a perspective view illustrating a first example of heat exchanger fins of the heat exchanger unit.
Figure 11:
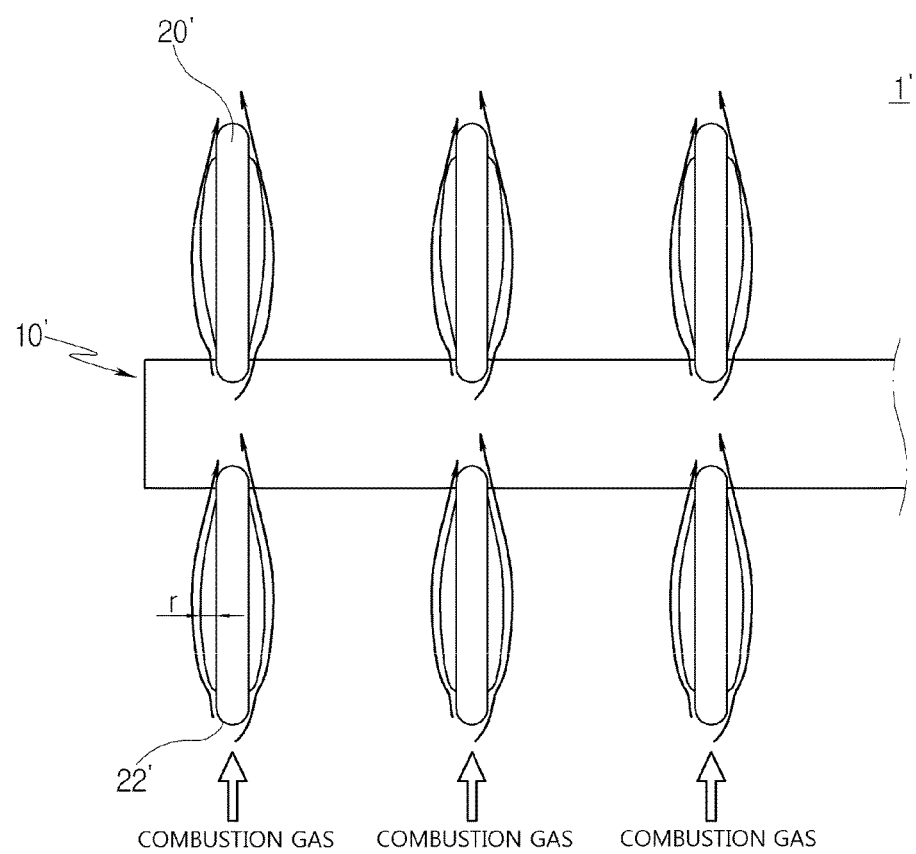
FIG. 11 is a top view illustrating the heat exchanger fins of FIG. 10.

FIG. 10 is a perspective view illustrating a first example of heat exchanger fins of the heat exchanger unit according to the present disclosure. FIG. 11 is a top view illustrating the heat exchanger fins of FIG. 10.

In the present embodiment, a tube unit 10' has a circular cross-section, and a plurality of heat exchanger fins 20' are arranged at regular intervals on the outer peripheral surface of the tube unit 10'.

Each of the heat exchanger fins 20' includes protrusion parts 22' protruding from the front and rear surfaces thereof while being respectively rounded in forward and rearward directions. The protrusion parts 22' allow combustion gas to move in the width direction of the associated heat exchanger fin 20' in the state in which the combustion gas comes into maximum contact with the outer peripheral surface of the heat exchanger fin 20' when moving along the outer peripheral surface thereof. Consequently, it is possible to minimize a phenomenon in which the combustion gas is separated from the outer peripheral surface of the heat exchanger fin 20'.

Each of the protrusion parts 22' has a streamlined shape, and specifically has an oval shape. Therefore, the combustion gas moves along the outer peripheral surface of the heat exchanger fin 20' in the state in which it comes into close contact with the outer peripheral surface of the heat exchanger fin 20'. Consequently, it is possible to prevent combustion gas from being separated when the combustion gas flows in the width direction of the heat exchanger fin 20' and to stably move the combustion gas in the state in which the combustion gas comes into close contact with the outer peripheral surface of the heat exchanger fin 20'.

Accordingly, since thermal energy included in the combustion gas is efficiently transferred through the outer peripheral surface of the heat exchanger fin 20', heat exchange efficiency can be improved.

Combustion gas is moved from the protrusion part 22', formed on the front surface of the heat exchanger fin 20' on the basis of the drawing, along the respective left and right surfaces of the heat exchanger fin 20', and is then moved to the protrusion part 22' formed on the rear surface thereof, in the state in which the combustion gas comes into maximum contact with the outer peripheral surface of the heat exchanger fin 20' when moving in the width direction thereof.

Each heat exchanger protrusion 30' includes a round part 32' protruding in a streamlined form outward from the outer peripheral surface of the associated heat exchanger fin 20' in order to increase a heat transfer area when combustion gas moves in the heat exchanger fin 20'. The round part 32' has a protrusion radius (r) which is decreased as directed toward the rear end of the heat exchanger fin 20' from the front end thereof.

As illustrated in the drawings, the heat exchanger protrusion 30' extends in the width direction of the heat exchanger fin 20', and the protrusion radius is decreased as the round part 32' is directed from front to rear on the basis of the drawing.

This is because when the front protrusion radius of the round part 32' is smaller than the rear protrusion radius thereof, the flow rate of the combustion gas is relatively increased at the rear rather than the front. In addition, heat transfer efficiency between high thermal energy included in combustion gas and the heat exchanger protrusion 30' can be improved through an increase in contact area by the protruding round part 32'.

In addition, since the heat transfer efficiency is improved to the level corresponding to the protrusion area of the heat exchanger protrusion 30', the heat transfer coefficient of a fluid moved through the tube unit 10' and the combustion gas is improved.

The heat exchanger protrusion 30' may be formed on each of the left and right surfaces of the heat exchanger fin 20, or may be selectively formed on one of the left and right surfaces. The rounded radius of the round part 32' may be changed.

The upper and lower surfaces of the heat exchanger protrusion 30' are inclined downward as the heat exchanger protrusion 30' is directed from the front end of the heat exchanger fin 20' to the rear end thereof. In this case, the flow rate of combustion gas is increased, and it is thus possible to minimize a phenomenon in which the combustion gas partially stays in any heat exchanger fin 20' located at a specific position.

When the heat exchanger protrusion 30' is set to have an optimal angle of downward inclination through a simulation, it is possible to prevent the flow of combustion gas from being separated due to an increase in flow rate thereof, and heat exchange efficiency in the heat exchanger protrusion 30' is therefore improved. Thus, the overall heat exchange efficiency can be improved through the plurality of heat exchanger fins 20' and heat exchanger protrusions 30' installed in the tube unit 10'.

The heat exchanger protrusions 30' include first heat exchanger protrusions 34' arranged to face the tube unit 10', and second heat exchanger protrusions 36' arranged so as not to face the tube unit 10'.

The first and second heat exchanger protrusions 34' and 36' may be arranged as illustrated in the drawings in order to efficiently perform heat transfer in the heat exchanger fins 20'. The first heat exchanger protrusions 34' arranged to face the tube unit 10' have a relatively short extension length compared to the second heat exchanger protrusions 36'.

This is caused by the shape of the tube unit 10', and the first heat exchanger protrusions 34' may protrude at a relatively small radius compared to the second heat exchanger protrusions 36'. As a result, it is possible to improve the flow rate of combustion gas and to prevent the flow separation of combustion gas.

Figure 12:
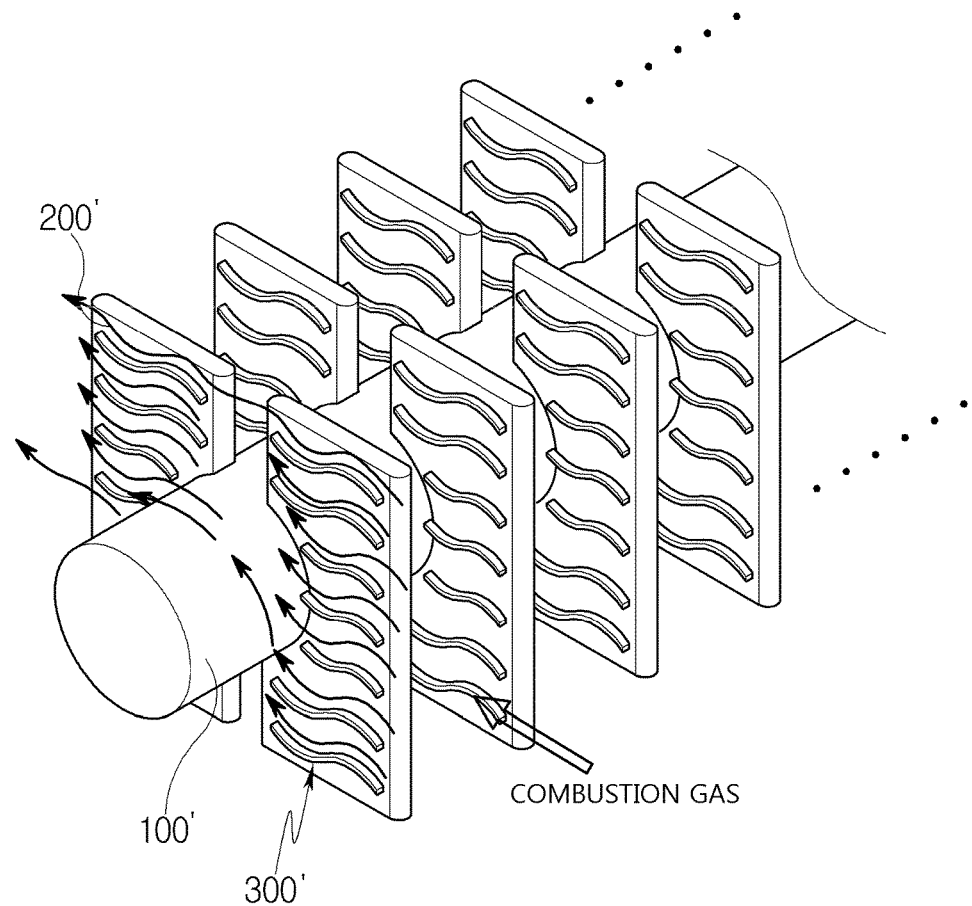
FIG. 12 is a perspective view illustrating a second example of heat exchanger fins of the heat exchanger unit.
Figure 13:
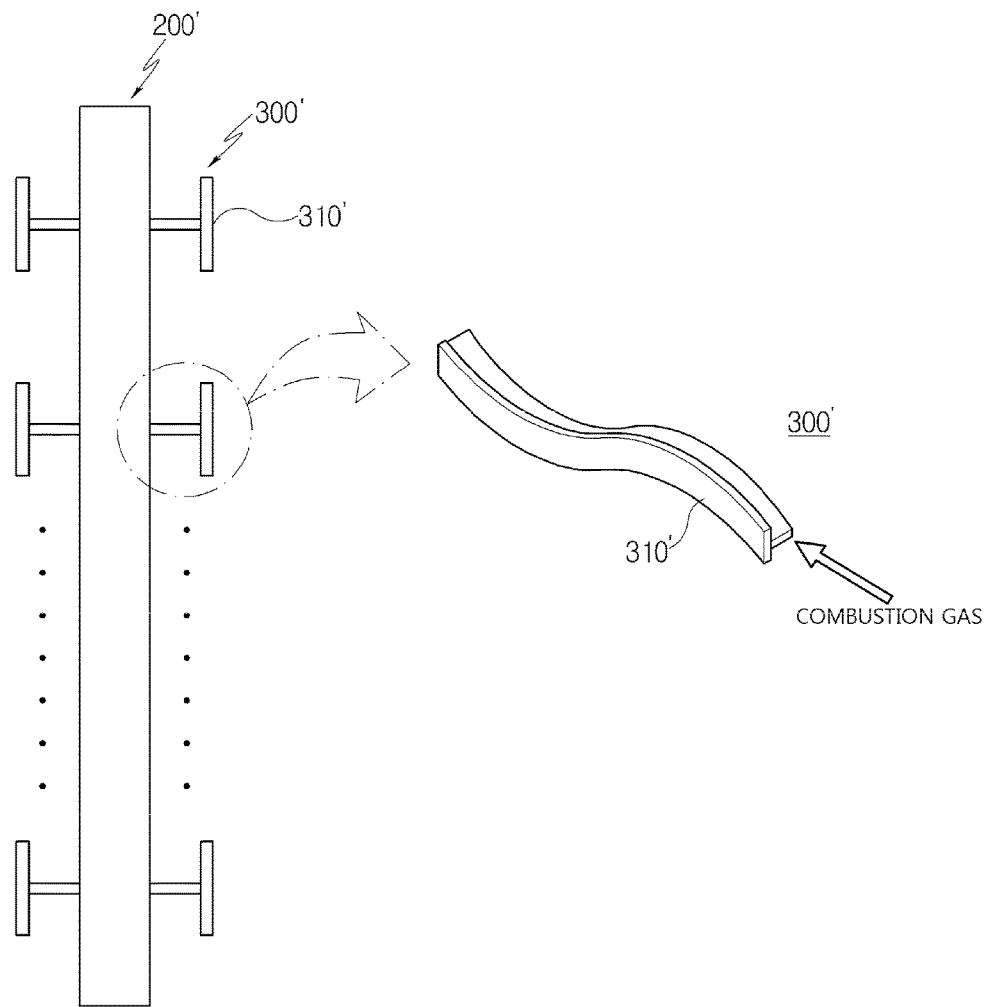
FIG. 13 is a perspective view illustrating a modification example of FIG. 12.

FIG. 12 is a perspective view illustrating a second example of heat exchanger fins of the heat exchanger unit according to the present disclosure. FIG. 13 is a perspective view illustrating a modification example of FIG. 12.

As illustrated in FIGS. 12 and 13, each heat exchanger fin, which is designated by reference numeral 200', according to the second example of the present disclosure includes heat exchanger ribs 300' protruding from the outer peripheral surface thereof while being corrugated in the width direction thereof.

The heat exchanger ribs 300' serve to improve heat exchange efficiency by increasing a direct contact area with combustion gas and to minimize the generation of turbulence due to flow separation when the combustion gas moves along the heat exchanger fin 200'. In addition, the heat exchanger ribs 300' serve to minimize pressure drop due to a difference in pressure at the inlet and the outlet of a duct unit 3'.

The flow separation of combustion gas may be increased when the combustion gas is moved outward from the outer peripheral surface of the heat exchanger fin 200'. For this reason, the combustion gas is preferably moved in the width direction of the heat exchanger fin 200' in the state in which it comes into maximum contact with the outer peripheral surface of the heat exchanger fin 200'. It is possible to suppress the flow separation of the combustion gas and to perform the stable movement of and heat exchange with the combustion through the heat exchanger ribs 300' formed on the outer peripheral surface of the heat exchanger fin 200'.

Since each heat exchanger rib 300' extends in the width direction of the heat exchanger fin 200' while being corrugated, the combustion gas is moved in a sine wave form along the heat exchanger rib 300'. Thus, the combustion gas is moved in the state in which it comes into close contact with the outer peripheral surface of the heat exchanger rib 300', while the flow rate of the combustion gas is not decreased in the width direction.

Referring to FIG. 13, each heat exchanger rib 300' includes a guide rib 310', the center of which is connected to the protruding end thereof, and the guide rib 310' extends vertically so as to guide the movement of the combustion gas along the heat exchanger rib 300'. The guide rib 310' extends to have the same length in upward and downward directions at the protruding end of the heat exchanger rib 300'.

If the combustion gas is moved along the outer peripheral surface of the heat exchanger rib 300', the guide rib 310' extends in the longitudinal direction of the heat exchanger rib 300' while being corrugated as illustrated in the drawing, so as not to generate the flow separation of the combustion gas.

In addition, the guide rib 310' extends to have the same length in upward and downward directions at the protruding end of the heat exchanger rib 300'. Thus, it is possible to minimize a phenomenon in which combustion gas moving along the upper and lower surfaces of the heat exchanger rib 300' is separated from the upper or lower surface thereof, and to further improve heat exchange efficiency.

The guide rib 310' may be perpendicular to the protruding end of the heat exchanger rib 300' and extend outward. The extension length of the guide rib 310' may be changed according to the flow rate of combustion gas, and is not limited to that illustrated in the drawings.

Figure 14:
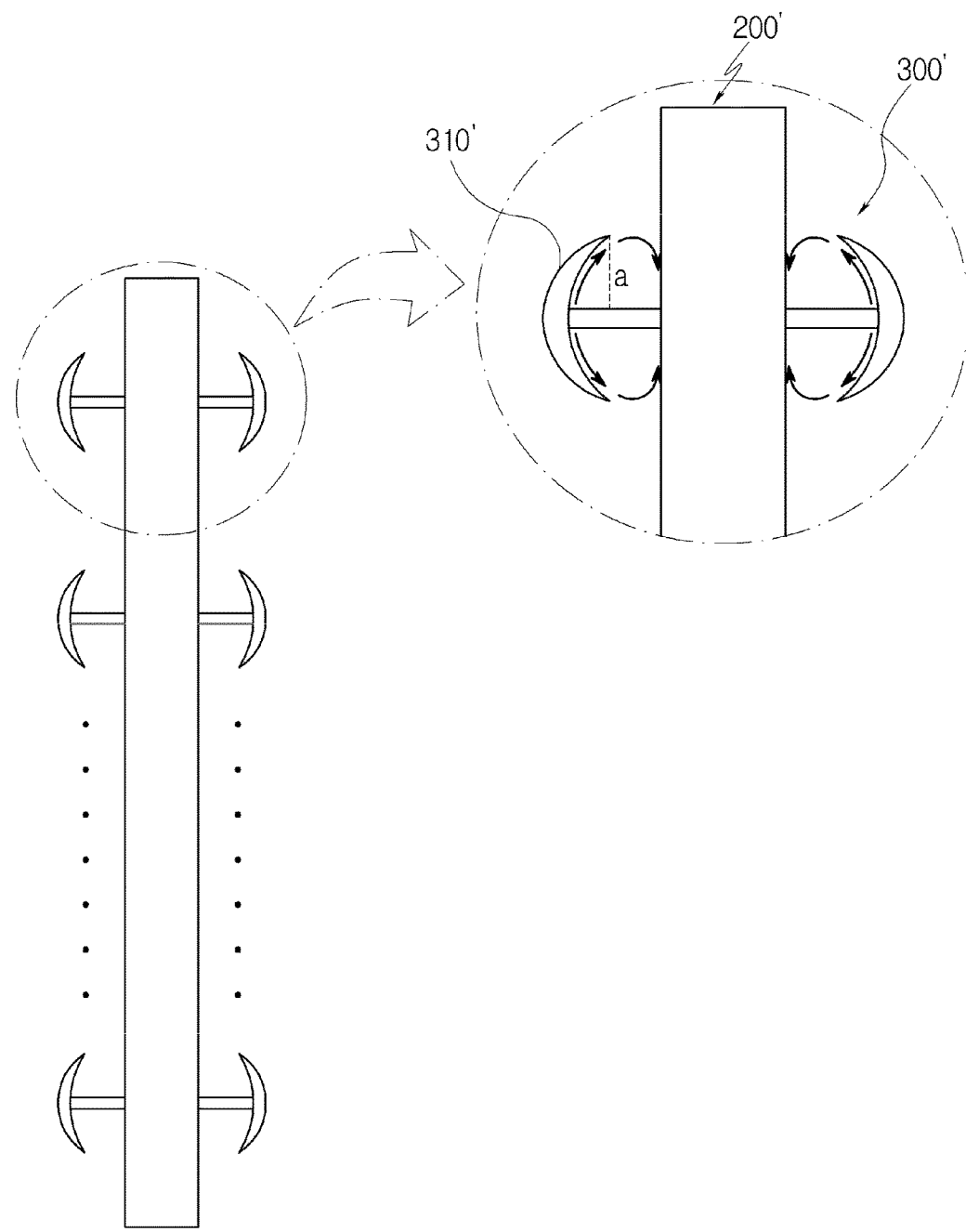
FIG. 14 is a view illustrating another example of heat exchanger ribs of FIG. 12.

FIG. 14 is a view illustrating another example of the heat exchanger ribs of FIG. 12.

Referring to FIG. 14, each heat exchanger rib 300' includes a guide rib 310', the center of which is connected to the protruding end thereof, and the guide rib 310' is rounded toward the heat exchanger fin 200' so as to guide the movement of combustion gas along the heat exchanger rib 300'.

The guide rib 310' differs from the above-mentioned guide rib in that it has a semicircular shape instead of having a plate shape. Accordingly, it is possible to prevent combustion gas from being separated when it is moved along the upper or lower surface of the heat exchanger rib 300'.

In particular, flow separation is generated at position a instead of the end of the heat exchanger rib 300' in the X-axis direction in the guide rib 310'. Accordingly, even when the combustion gas is moved upward or downward, the guide rib 310' serves to prevent the flow of the combustion gas from being separated from the upper or lower surface of the heat exchanger rib 300', and allows the combustion gas to be joined to combustion gas moving along the upper or lower surface of the heat exchanger rib 300'. Consequently, the flow separation is minimized.

Figure 15:
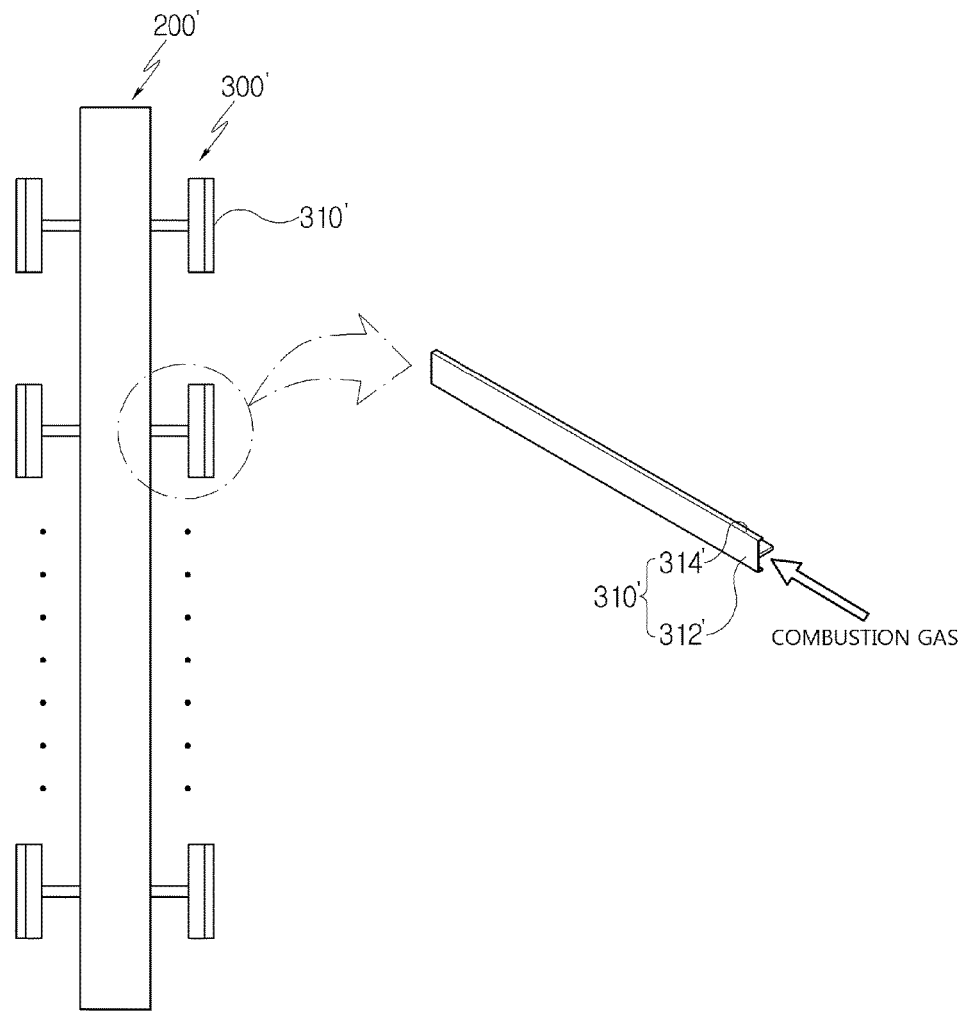
FIGS. 15 and 16 are views illustrating a further example of the heat exchanger ribs of FIG. 12.
Figure 16:
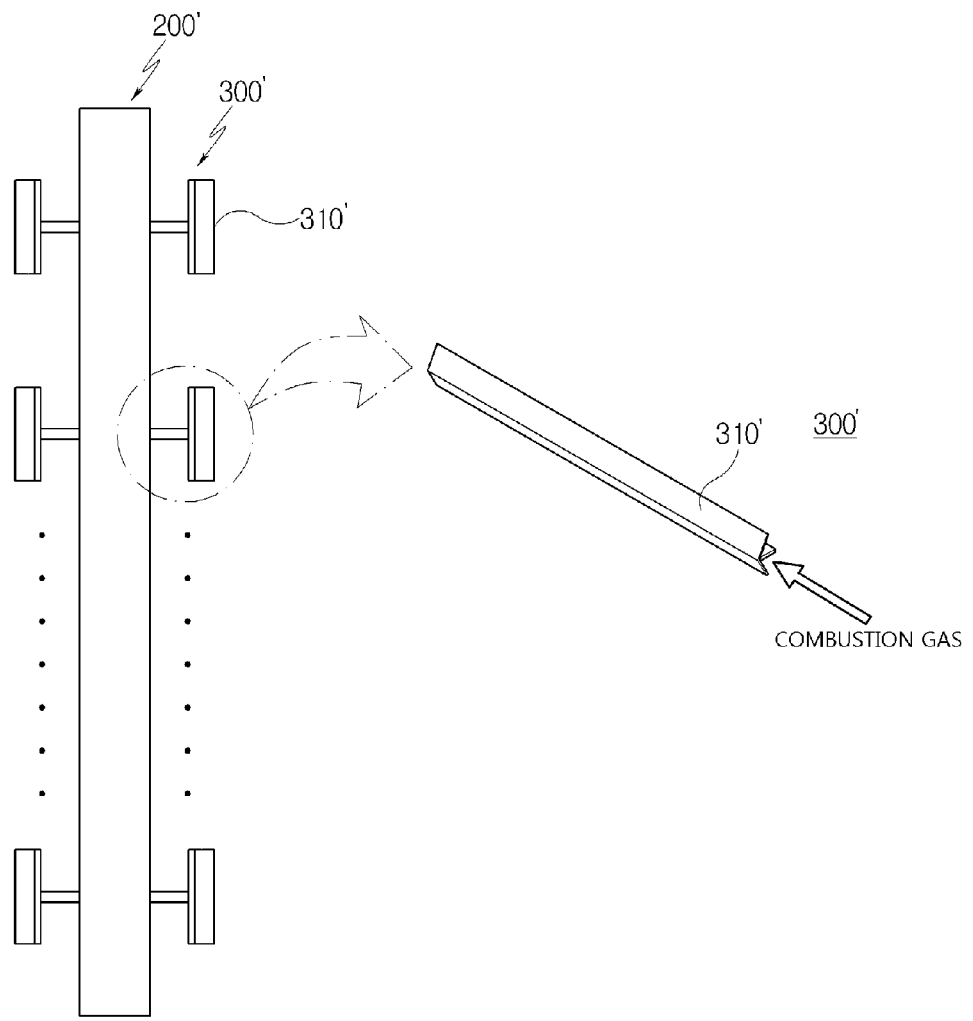

FIGS. 15 and 16 are views illustrating a further example of the heat exchanger ribs of FIG. 12.

Referring to FIG. 15, each guide rib 310' includes a first extension part 312', the center of which is connected to the protruding end of the heat exchanger rib 300', the first extension part 312' extending vertically to have a predetermined length, and second extension parts 314' which are respectively bent toward the heat exchanger fin 200' from the ends of the first extension part 312'.

Each of the first and second extension parts 312' and 314' has one of a polygonal shape and a shape that is inclined at a predetermined angle toward the heat exchanger rib 300'. In this case, it is possible to minimize a phenomenon in which combustion gas moving along the upper and lower surfaces of the heat exchanger rib 300' is separated in the width direction of the heat exchanger fin 200'. Thus, heat transfer efficiency between high thermal energy included in the combustion gas and a fluid flowing through the tube units 100' can be improved.

Referring to FIG. 16, each guide rib 310' is installed so as to be inclined at a certain angle toward the heat exchanger fin 200' from the end of the heat exchanger rib 300'. In this case, the flow rate of combustion gas moving along the outer end of the heat exchanger rib 300' may be relatively high compared to that at a position close to the heat exchanger fin 200'. Such a flow of combustion gas is generated since the heat exchanger rib 300' is obliquely disposed and a space in which the combustion gas moves becomes small. Thus, the flow rate of the combustion gas, which moves in a relatively wide space at a position adjacent to the heat exchanger fin 200', may be increased, thereby minimizing the generation of turbulence due to flow separation.

As is apparent from the above description, it is possible to improve heat exchange efficiency by the heat exchanger unit which maximally performs heat exchange with thermal energy included in combustion gas generated in the furnace of the thermal power plant, and to stably perform heat exchange by guiding the movement of the combustion gas in a specific form.

In addition, since the diffusion and delay of combustion gas are performed in the duct unit, heat exchange can be performed uniformly in all of first to nth tube units without being restrictively performed only in any one of the first to nth tube units, thereby improving heat exchange efficiency.

While the present disclosure has been described with respect to the specific embodiments, it will be apparent to those skilled in the art that various changes and modifications may be made without departing from the spirit and scope of the invention as defined in the following claims.

What is claimed is:

1. A heat exchanger unit comprising:
   tube units arranged within a duct unit configured for heat exchange with combustion gas supplied from a furnace of a thermal power plant; and
   heat exchanger fins formed on outer peripheral surfaces of the tube units, wherein the heat exchanger fins have a width side, a length side and a thickness side, and the length side is longer than the width side and the thickness side, and a direction of the length side of the heat exchanger fins traverses a direction of a longitudinal length of the tube units, the heat exchanger fins having different thickness and sizes, configured to perform heat exchange with the combustion gas.

2. The heat exchanger unit according to claim 1, wherein the tube units have different diameters.

3. The heat exchanger unit according to claim 1, wherein the tube units consist of linear parts, each extending by a predetermined length in the duct unit, and curved parts extending outward from ends of the linear parts, and the linear parts and curved parts are alternately repeated.

4. The heat exchanger unit according to claim 1, wherein the tube units comprise a first tube unit with which the combustion gas first comes into contact, and second to nth tube units arranged in order and adjacent to the first tube unit, and the tube units have increasing diameters in a direction toward the nth tube unit from the first tube unit.

5. The heat exchanger unit according to claim 4, wherein the heat exchanger fins have increasing thicknesses that become thicker in a direction toward the nth tube unit from the first tube unit.

6. The heat exchanger unit according to claim 5, wherein a spaced distance between the heat exchanger fins becomes smaller in a direction toward the nth tube unit from the first tube unit.

7. The heat exchanger unit according to claim 5, wherein the heat exchanger fin located adjacent to an inner side of the duct unit has a thinner thickness than the heat exchanger fin located at a center of the duct unit.

8. The heat exchanger unit according to claim 5, wherein each of the heat exchanger fins has one of a flat shape, a trapezoidal shape that has a decreased width outward of the tube units, or a spiral shape that has a predetermined width and thickness in a longitudinal direction of the tube units.

9. The heat exchanger unit according to claim 1, further comprising a plurality of heat exchanger protrusions arranged on an outer peripheral surface of each of the heat exchanger fins in a longitudinal direction of the heat exchanger fins and extending in a width direction of the heat exchanger fin, wherein the heat exchanger fin comprises protrusion parts protruding from front and rear surfaces thereof and rounded in forward and rearward directions, respectively.

10. The heat exchanger unit according to claim 9, wherein each of the heat exchanger protrusions comprises a rounded part protruding outward from the outer peripheral surface of the heat exchanger fin, and the rounded part has a radius which decreases in a direction toward a rear end of the heat exchanger fin from a front end thereof.

11. The heat exchanger unit according to claim 9, wherein each of the heat exchanger protrusions has upper and lower surfaces inclined downward in a direction from a front end of the heat exchanger fin to a rear end thereof.

12. The heat exchanger unit according to claim 9, wherein the heat exchanger protrusions comprise first heat exchanger protrusions arranged to face the tube units, and second heat exchanger protrusions arranged so as not to face the tube units, and the first heat exchanger protrusions each have a shorter extension length than the second heat exchanger protrusions.

13. The heat exchanger unit according to claim 1, further comprising heat exchanger ribs protruding from an outer peripheral surface of each of the heat exchanger fins and corrugated in a width direction thereof, wherein each of the heat exchanger ribs comprises a guide rib, a center of which is connected to a protruding end of the heat exchanger ribs, the guide rib extending vertically so as to guide movement of the combustion gas along the heat exchanger rib, and the guide rib extends to have the same length in upward and downward directions at the protruding end of the heat exchanger rib, or is perpendicular to the protruding end of the heat exchanger rib to extend outward.

14. The heat exchanger unit according to claim 1, further comprising heat exchanger ribs, wherein each of the heat exchanger ribs comprises a guide rib, a center of which is connected to a protruding end of the guide rib, the guide rib being rounded toward the heat exchanger fins so as to guide movement of the combustion gas along the heat exchanger rib, and the guide rib comprises a first extension part, a center of which is connected to the protruding end of the heat exchanger rib, the first extension part extending vertically to have a predetermined length, and second extension parts respectively bent toward the heat exchanger fins from ends of the first extension part.

15. A heat exchanger unit comprising:
tube units arranged within a duct unit configured for heat exchange with combustion gas supplied from a furnace of a thermal power plant; and
heat exchanger fins formed on outer peripheral surfaces of the tube units, wherein the heat exchanger fins have a width side, a length side, and a thickness side, and the length side is longer than the width side and the thickness side, and a direction of the length side of the heat exchanger fins traverses a direction of a longitudinal length of the tube units, and the heat exchanger fins having different thickness and sizes and configured to perform heat exchange with the combustion gas,
wherein the heat exchanger fins are arranged in a zigzag formation along a movement direction of the combustion gas, and
wherein the tube units consist of linear parts, each extending by a predetermined length in the duct unit, and curved parts extending outward from ends of the linear parts, the linear parts and curved parts being alternately repeated, or the tube units comprises a first tube unit with which the combustion gas first comes into contact, and second to nth tube units arranged adjacent to the first tube unit, the tube units having increasing diameters as directed toward the nth tube unit from the first tube unit.

16. The heat exchanger unit according to claim 15, wherein the heat exchanger fins arranged in the zigzag formation comprise:
first heat exchanger fins arranged to be inclined at a first angle of inclination to the movement direction of the combustion gas in the first tube unit; and
second heat exchanger fins arranged to be inclined at a second angle of inclination that is in a direction opposite to an inclined direction of the first heat exchanger fins in the second tube unit adjacent to the first tube unit, the first and second heat exchanger fins being alternately repeated in a longitudinal direction of the duct unit.

17. The heat exchanger unit according to claim 16, wherein the first angle of inclination is an angle of 10 to 15 degrees, and the second angle of inclination is an angle of −10 to −15 degrees.

18. A heat exchanger unit comprising:
a plurality of tube units arranged within a duct unit configured for heat exchange with combustion gas supplied from a furnace of a thermal power plant;
heat exchanger fins formed on outer peripheral surfaces of the tube units, wherein the heat exchanger fins have a width side, a length side and a thickness side, and the length side is loner than the width side and the thickness side, and a direction of the length side of the heat exchanger fins traverse a direction of a longitudinal length of the tube units, the heat exchanger fins having different thickness and sizes and configured to perform heat exchange with the combustion gas; and a diffusion part defining a predetermined space in the duct unit configured for diffusion of the combustion gas.

19. The heat exchanger unit according to claim 18, wherein:

the tube units comprise a first tube unit which the combustion gas first comes into contact with, and second to nth tube units arranged adjacent to the first tube unit; and the diffusion part is formed between the first to nth tube units, or defines spaces having different sizes in a longitudinal direction of the duct unit.

20. The heat exchanger unit according to claim 19, wherein when the diffusion part is configured of a plurality of diffusion parts in the longitudinal direction of the duct unit, areas of spaces defined by the diffusion parts are decreased toward a rear end of the duct unit in the longitudinal direction thereof.

* * * * *